US012783677B2

(12) United States Patent
Patino et al.

(10) Patent No.: US 12,783,677 B2
(45) Date of Patent: Nov. 3, 2026

(54) UPDATE AGENT AND DATA PRE-SEEDING IN UPDATE AGENT

(71) Applicant: GIESECKE+DEVRIENT MOBILE SECURITY GERMANY GMBH, Munich (DE)

(72) Inventors: David Patino, Sant Vicenc dels Korts (ES); Clara Gifre, Barcelona (ES); Federico Ruau, Hospitalet de Llobregat (ES); Bjorn Kornefalk, Arsta (SE)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 7 days.

(21) Appl. No.: 18/292,524

(22) PCT Filed: Jul. 26, 2022

(86) PCT No.: PCT/EP2022/025345
§ 371 (c)(1),
(2) Date: Jan. 26, 2024

(87) PCT Pub. No.: WO2023/006242
PCT Pub. Date: Feb. 2, 2023

(65) Prior Publication Data
US 2024/0338451 A1 Oct. 10, 2024

(30) Foreign Application Priority Data
Jul. 28, 2021 (EP) .................................... 21382703

(51) Int. Cl.
*G06F 21/57* (2013.01)
*G06F 9/445* (2018.01)

(52) U.S. Cl.
CPC .......... *G06F 21/572* (2013.01); *G06F 9/4451* (2013.01)

(58) Field of Classification Search
CPC ............................ G06F 21/572; G06F 9/4451
USPC .............................................................. 713/2
See application file for complete search history.

(56) References Cited

U.S. PATENT DOCUMENTS 10,069,633 B2 * 9/2018 Gulati .................. G06F 21/572
10,936,719 B2 * 3/2021 Sibert ................ H04W 12/086

OTHER PUBLICATIONS

Extended European Search Report from corresponding European Patent Application No. EP21382703.3, Nov. 19, 2021.
International Search Report from corresponding PCT Application No. PCT/EP2022/025345, Oct. 18, 2022.

* cited by examiner

*Primary Examiner* — Jaweed A Abbaszadeh
*Assistant Examiner* — Cheri L Harrington
(74) *Attorney, Agent, or Firm* — Workman Nydegger

(57) ABSTRACT

An update agent, a secure element containing the update agent, and a method for loading and personalizing a software in the secure element are provided. In a first step, an update agent is loaded into the se-cure element. In a further step, software personalization data is loaded into the secure element, and stored in the update agent. Subsequently, the software is loaded into the secure element and personalized using the software personalization data stored in the update agent.

10 Claims, 6 Drawing Sheets

UPDATE AGENT AND DATA PRE-SEEDING IN UPDATE AGENT

The present invention relates to secure elements in general and in particular to a secure element fitted with an update agent with data pre-seeding capabilities and a method for loading and personalizing software using pre-seeded data in the update agent.

BACKGROUND OF THE INVENTION

Smart cards are widely used in a variety of systems such as mobile phones, payment cards, access cards, to provide identification, authentication, data storage and application processing.

Where the smart card contains security-critical applications and sensitive data, such as in the case of payment cards and the like, a secure element is used to store the data. A secure element is a tamper resistant element, TRE, that provides a secure memory and execution environment in which application code and application data can be securely stored and administered. The secure element ensures that access to the data stored on the card is provided only when authorized.

Such a secure element may exist in any form factor such as UICC, embedded SE, smartSD, smart microSD, etc.

A secure element may include one or more security domains (SDs), each of which includes a collection of data, such as operating system, personalization data, packages, applets, applications, and the like, which are authenticated using security keys. Thus, the operating system and applications are stored within the secure element in volatile and non-volatile memory modules, and are executed in a secured processor of the secure element.

The specification Global Platform Card Technology Open Firmware Loader for Tamper Resistant Element v1.3 (in the following referred by [1]) describes a standardized mechanism for loading firmware (that is, use case dependent data which may contain the operating system and application data) into a secure element. In particular, an Open Firmware Loader, OFL, alternatively, an Image Trusted Loader, ITL, or update agent, is provided inside the secure element, and configured to receive images of operation system and personalization data, to perform security checks—particularly authentication and integrity checks—on the images, and to trigger installation of the image contents into a memory of the secure element, so as to install in the secure element an operating system and personalization data.

For usage as an eSIM card, it is of utmost importance to keep identities safe and protected for unauthorized modifications. Some of these identities have specific certification requirements related to the environment where they can be loaded to a card. In particular, credentials comprising keys and certificates must be loaded in a controlled environment due to certain production-related restrictions, such as the need to have a certified environment to store keys from certain entities or the adaptations required to personalize diversified data in factory.

FIG. 1 shows a schematic representation of the conventional production flow for loading firmware (e.g., an operating system, OS) into a secure element. The upper row shows the entities responsible for the corresponding production phase (I, II, III, IV), while the lower row shows the content of the secure element (i.e., chip). A chip manufacturer can provide, during a first production phase I, for a secure element to be loaded (usually in the chip factory) with trusted software, such as a secure operating system (OS) 130. The secure OS is personalized with credentials, which are keys or certificates, and which are stored in a personalized OS image, (e.g., in FIG. 1 identified by "maxiinit").

The personalized secure OS image 130 is loaded together with the update agent 110 inside the chip. The chip with its OS can then (phase II) be embedded in a portable card-like device or delivered to another device manufacturer to be included (phase III) in a bigger electronic device like a smart phone, a computer, a car, a measurement equipment, etc., and finally released to the market (phase IV).

By following this conventional process, once the OS has been loaded in the chip it remains the same until the embedded chip is delivered to the market.

Although the trusted software could be loaded anywhere via the update agent of the SE (provided that the trusted software image itself is properly secured), the credentials including the keys and certificates have to be loaded in the certified environment during factory production. Therefore, in cases where the trusted software is loaded at a later phase in the flow identified in FIG. 1, instead of being loaded during phase I of the production chain, the trusted software cannot be personalized, as no certified environment is present outside the chip factory, to allow loading the required personalization data in a secure manner.

Accordingly, there remains a need to provide a solution for loading and personalizing a trusted software into a secure element which addresses the above-mentioned drawbacks.

SUMMARY OF THE INVENTION

According to a first aspect of the present invention, there is provided a method for loading and personalizing a software in a secure element, SE. The method comprises in a first step, loading an update agent into the SE. In a further step, software personalization data is loaded into the SE, and stored in the update agent. Subsequently, the software is loaded into the SE and personalized using the software personalization data stored in the update agent.

Through this application the expression "software" refers to any trusted software to be loaded and executed in the secure element. Examples include firmware, an operating system (OS), and any other use-case dependent secure applications. The expression "software image" (or "OS image") refers to a generic data format encapsulating a software version and cryptographic data to be used by the update agent.

The proposed method provides an efficient and secure solution for loading trusted software independently of the corresponding personalization data in a secure element. As the trusted software does not need to be loaded at the same time with the personalization data, a flexible solution for loading, updating and personalizing software at any time during the lifecycle of a secure element is provided.

In some embodiments of the present invention, the software personalization data is loaded together with the update agent into the SE in a certified environment during a production phase of the SE.

Preferably, the software personalization data comprises secure credentials, in particular, a set of cryptographic keys.

By loading the personalization data, including secure credentials, together with the update agent into the secure element in a certified environment, it is ensured that strictly confidential personalization data are loaded under strict safety conditions and are thus protected from unauthorized modifications.

Preferably, the personalization data is stored in a memory of the update agent, such as a non-volatile memory.

The secure credentials are thus being securely loaded into the tamper resistant SE and stored in the update agent, but they have not been tied to a specific software image yet.

The software is preferably loaded into the SE in a later phase following the production phase of the SE.

This increases the flexibility and versatility of secure elements and their applications within electronic devices, while still providing the required security level for personalizing the software.

In some embodiments of the present invention, the software personalization data is obtained, after loading the software, from the update agent through an Application Programming Interface, API.

According to a second aspect of the present invention, there is provided a secure element (SE) comprising an update agent and an operating system (OS). The update agent and the operating system are configured to communicate with each other through an Application Programming Interface (API). The update agent may comprise a first memory for storing authentication data for authenticating a software image, and a second memory for storing personalization data of the software image.

In some embodiments of the present invention according to the first or the second aspect, the update agent is configured upon receiving the software image, to perform authentication of the software image using the authentication data stored in the first memory of the update agent.

Preferably, the secure element, particularly the update agent, authenticates the software image by verifying a digital signature, which may be associated with a vendor of the secure element or with a provider of an electronic device the secure element is embedded on. The digital signature may also be associated with an applet installed on the secure element. For instance, the update agent may use an encryption key associated with a particular vendor or device to verify the integrity of the software image.

In some embodiments of the present invention according to the first or the second aspect, the update agent is configured upon receiving the software image, to decrypt the software image using the authentication data stored in the first memory of the update agent.

The secure element may decrypt the software image using a second encryption key, which may be the same or different from the encryption key used for authentication. In one embodiment a public-private keys pair is used. Alternatively, a symmetric encryption method is used. The same encryption key may be used to sign, encrypt and/or decrypt the software image.

In some embodiments of the present invention, the secure element is configured to instruct the operating system, OS, to retrieve the personalization data stored in the second memory in the update agent, to perform personalization of the software image using the personalization data, and to store the personalized software image in a memory of the SE.

Preferably, the secure element is configured to retrieve the personalization data by instructing the OS to perform a data recovery procedure with the update agent through the API.

In some embodiments, the secure element includes a processor, and memory, coupled to the processor, which stores a program module executed by the processor. The program module may include instructions for at least some of the aforementioned operations performed by the secure element.

According to a further aspect of the present invention, there is provided an update agent for use in a secure element, comprising a first memory for storing authentication data for authenticating software images, and a second memory for storing personalization data of software images.

This allows for the provision of an update agent with pre-seeding capabilities, that is, for pre-seeding software data, in particular OS data onto a secure element.

In some embodiments the update agent comprises further an application programming interface, API. The update agent is configured upon receiving a software image from a device, to perform authentication and/or decryption of the software image using the stored authentication data, and to provide to an operating system of the secure element the personalization data corresponding to the software image, through the API.

The update agent is thus a stand-alone entity which is loaded in the factory onto the secure element, and which allows an operating system and/or other trusted software to be loaded on top of it at any time, even when the secure element, respectively a device the secure element is embedded on, is already deployed in the field. Thus, the update agent allows to directly load an operating system in the field, that is, outside a certified environment.

According to a further aspect of the present invention, there is provided an electronic device, comprising at least one processor, at least one memory including computer program code, and a secure element SE. The at least one processor with the at least one memory and the computer program code, are arranged to cause the electronic device to at least perform: providing to the SE a software image, to be loaded and stored thereon; instructing the SE to perform authentication and/or decryption of the software image using authentication data stored in the SE; and instructing the SE to retrieve personalization data stored in the SE, to perform personalization of the software image using the personalization data, and to store the personalized software image in the SE.

According to yet a further aspect of the present invention, there is provided a computer-program product for use in conjunction with a secure element in an electronic device, the computer-program product comprising a non-transitory computer-readable storage medium and a computer-program mechanism embedded therein, to load a software into the secure element in the electronic device, the computer-program mechanism including instructions for receiving, from an image delivery server, a software image to be loaded onto the SE; instructions for authenticating and/or decrypting the software image using authentication data stored in the SE; instructions for personalizing the software image using personalization data stored in the SE; and instructions for installing the personalized software image on the SE.

It has to be noted that all the devices, elements, units and means described in the present application could be implemented in software or hardware elements or combination thereof. All steps which are performed by the various entities described in the present application as well as the described functionalities are intended to mean that the respective entity is adapted to or configured to perform the respective steps and functionalities.

Further aspects, features and advantages of the present invention will become apparent to those of ordinary skills in the art upon reviewing the following detailed description of preferred embodiments and variants of the present invention in conjunction with the accompanying figures.

BRIEF DESCRIPTION OF THE DRAWINGS

Reference will now be made to the accompanying figures, in which.

DETAILED DESCRIPTION

Figure 1:
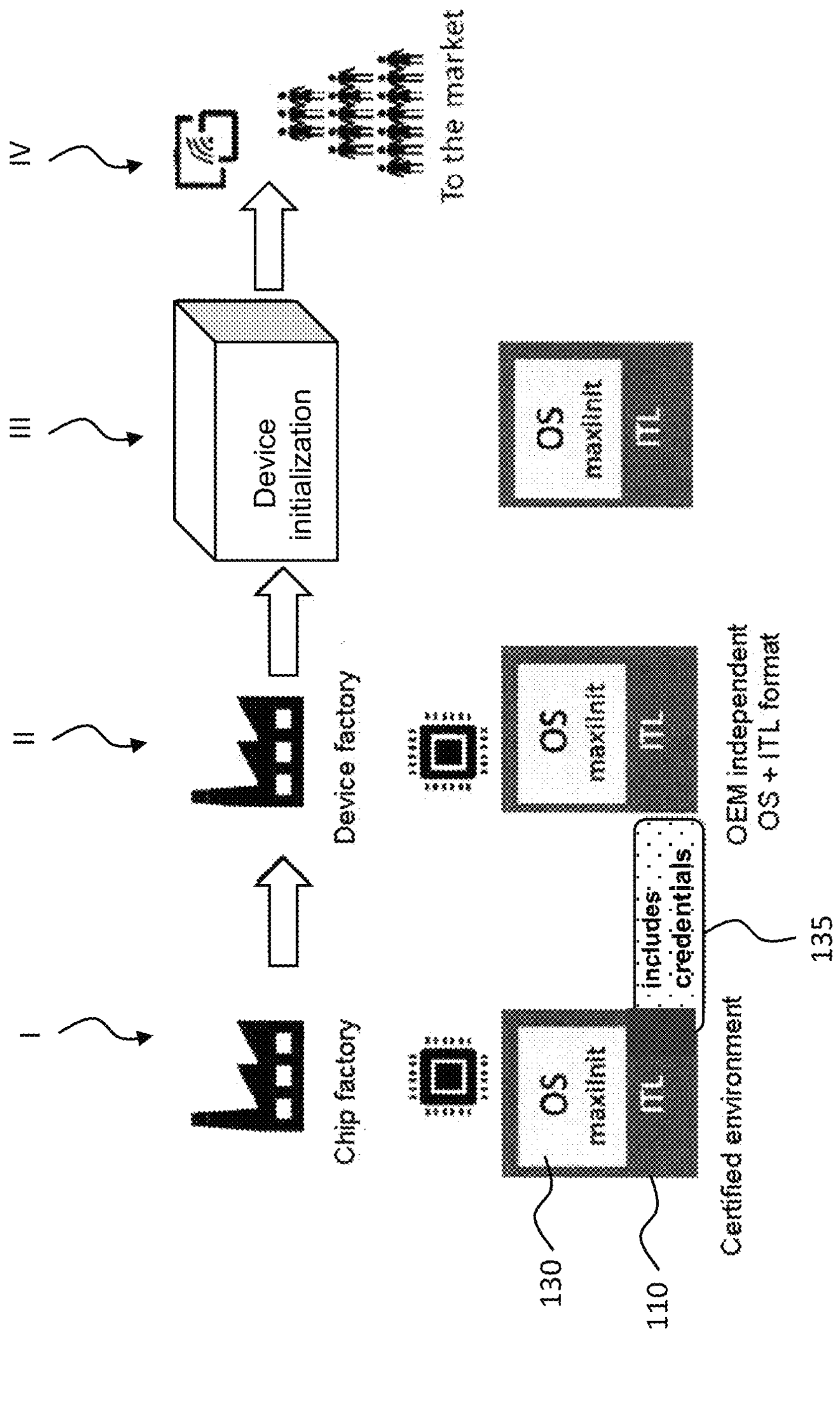
FIG. 1 shows a schematic representation of the conventional production flow of a secure element.

Detailed explanations of the present invention are given below with reference to attached drawings that illustrate specific embodiment examples of the present invention. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the scope of the present invention. In addition, it is to be understood that the position or arrangement of individual elements within each disclosed embodiment may be modified without departing from the scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
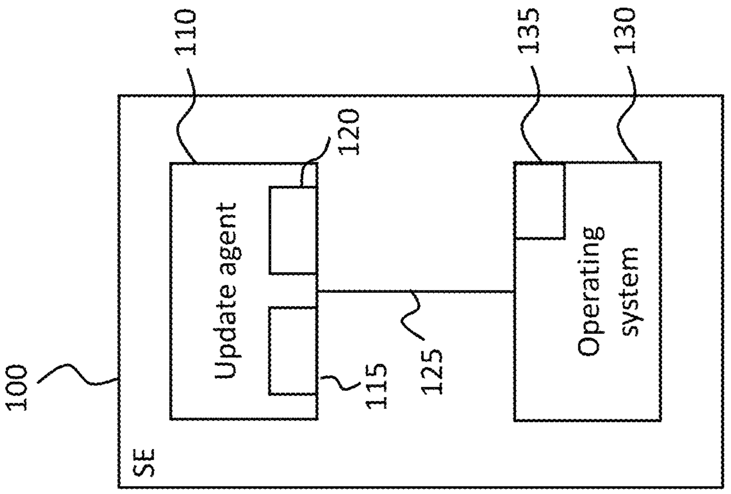
FIG. 2 shows the structure of a secure element according to an embodiment.

FIG. 2 shows the structure of a SE 100 according to an embodiment.

The SE 100 is a tamper resistant element, containing the update agent 110 and the OS 130. Both the update agent 110 and the OS 130 may be stored in a memory of the SE (not shown in FIG. 2). The OS and the update agent are independent entities that can communicate with each other, for instance over an Application Programming Interface, API 125.

The update agent 110 is a loader entity allowing the provisioning of software (such as, for instance, use case dependent firmware) within the SE. The update agent is the main entity in charge of loading software in the secure element, as well as any other procedure related to it (e.g., update, restore, rollback). The update agent 110 is loaded onto the SE 100 during factory production.

The update agent 110 may contain two different memory structures or regions, to store sensible data thereon. A first memory structure 115 preferably contains authentication data, which is used by the update agent to authenticate and decrypt the software or OS image when loaded or updated at a later time. Preferably, the first memory structure 115 comprises security keys or private credentials, for example, to gain access to change the firmware or to authenticate access for another application such as eSIM and other applications needed protected security keys. Only the update agent 110 has access to the memory region 115.

The second memory structure 120, which is accessible both by the update agent 110 and the operating system 130 (the operating system 130 will access the second memory structure 120 through the API 125), may contain the personalization data of the OS, that is, the OS credentials 135. These credentials are loaded onto the SE 100 together with the loading of the update agent 110 during factory production phase I, and are stored in the second memory 120 of the update agent 110.

This ensure that the operation of loading the OS credentials is performed in a certified environment. When the OS is loaded in a later phase, the OS can be securely personalized by using the credentials. In addition, if the OS is updated, the personalization data are still securely stored in the SE and can be retrieved after the new OS version is loaded and applied to the new OS version for personalization.

This facilitates performing an OS load as well as an OS update outside of the certified environment. More flexibility to the SE production and deployment is thus conferred.

Figure 3:
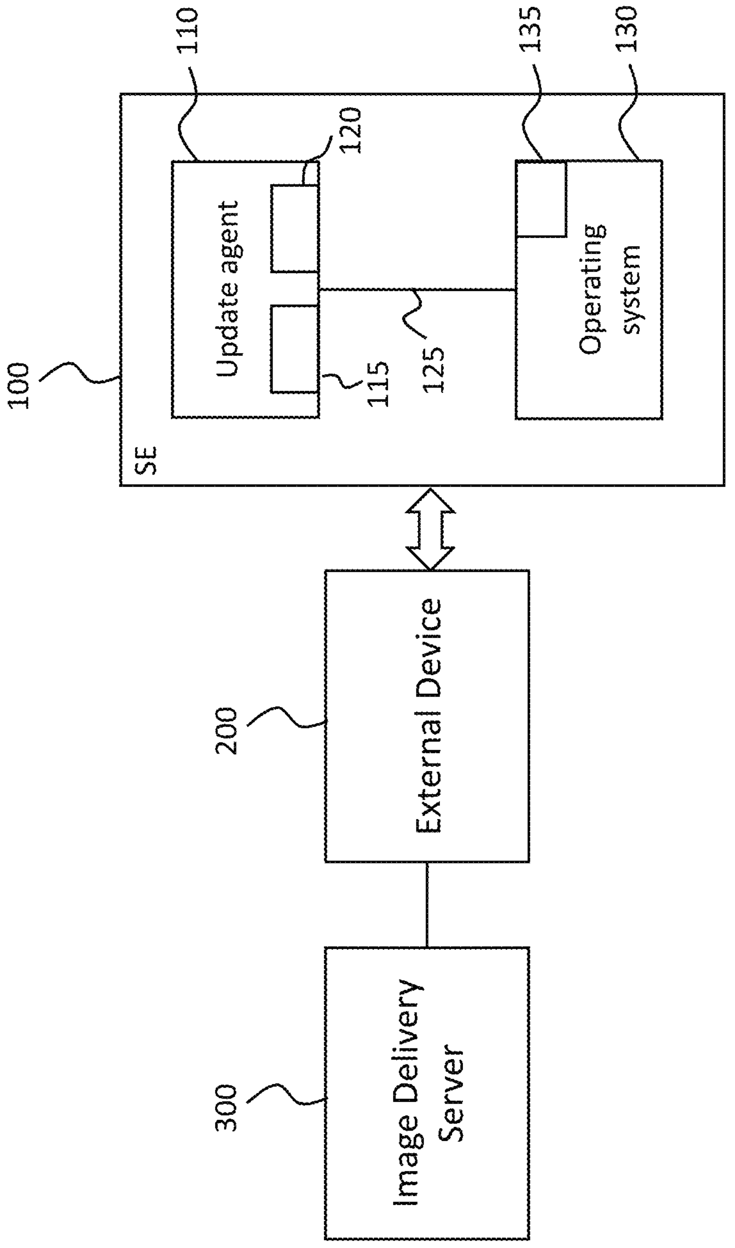
FIG. 3 shows the architecture of a system for implementing a method for loading and personalizing software in a secure element according to an embodiment.

FIG. 3 shows the architecture of a system and flow of data for implementing a method for loading and personalization of an OS, according to an embodiment.

An OS load respectively an OS update may be initiated by an external device 200 (which is external of the SE). The external device may describe an entity which is in control and communicates with the SE 100. It can be a LPA (Local Profile Assistant), a terminal, or whatever device it is that the SE is mounted on. The external device 200 may fetch a software or OS image, for instance from an image delivery server 300, and provide the image to the SE through a customized interface.

Figure 4:
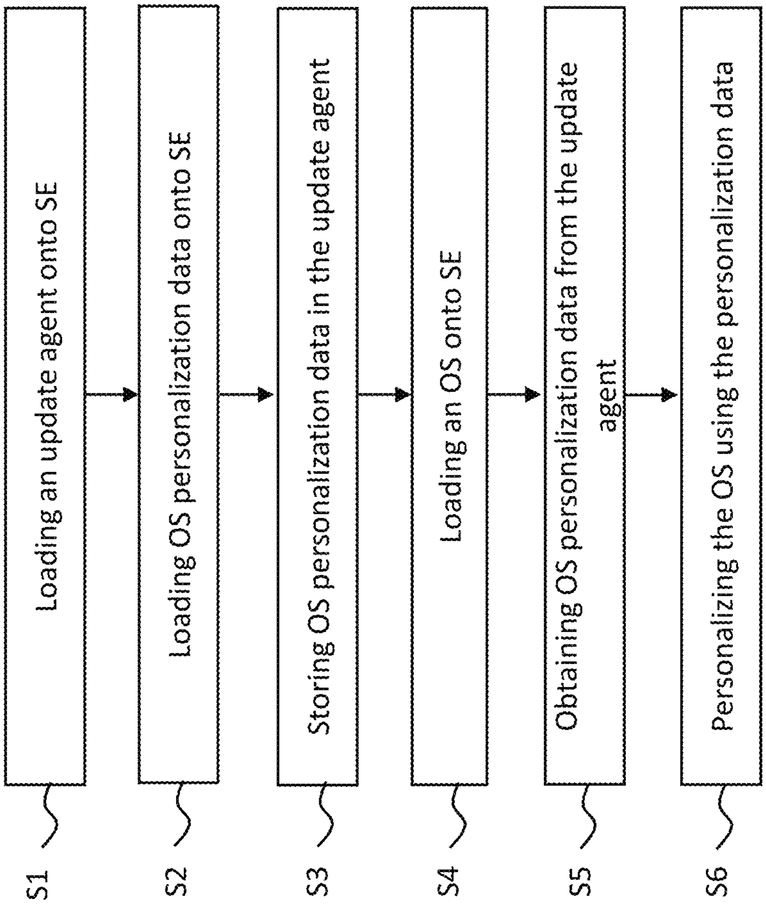
FIG. 4 shows a flow diagram illustrating a method for loading and personalizing software in a secure element according to an embodiment.

FIG. 4 shows a flow chart of the main steps of a method for loading and personalizing a software, in particular, an operating system, OS, in a secure element.

Figure 5:
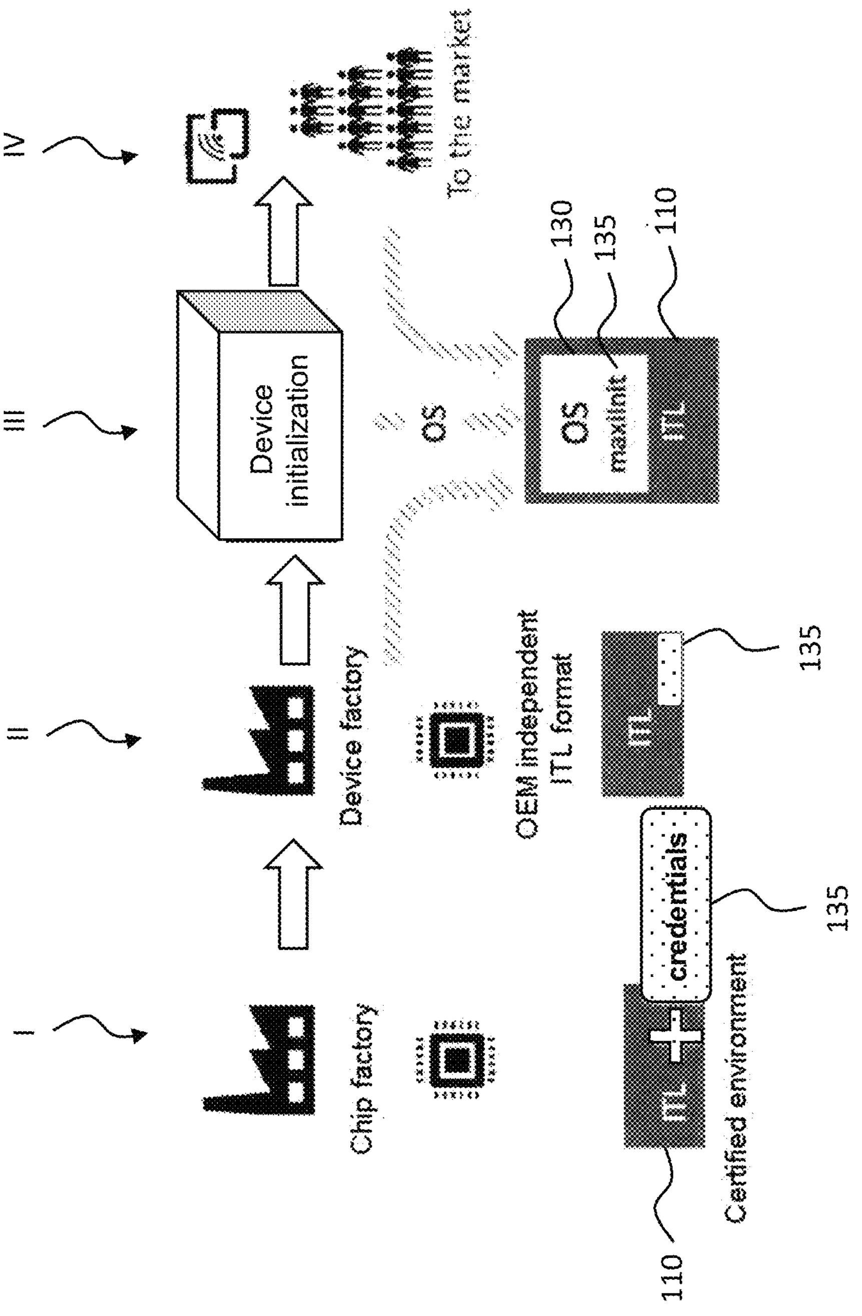
FIG. 5 shows a schematic representation of the production flow of a secure element according to an embodiment.

FIG. 5 shows a schematic representation of the production flow of a secure element which is based on implementing the steps of the flow chart in FIG. 4. The upper row shows the entities responsible for the corresponding production phases (I, II, III, IV), while the lower row shows the content of the secure element (i.e., chip) in each production phase.

The method is described in the following taking the OS as an example of software to be loaded and personalized. However, the method is not restricting to the OS software, and is applicable to any other software that can be executed on the secure element, such as, for instance firmware or an applet/application.

With reference to FIG. 4, in a first step S1, an update agent 110 is loaded onto the secure element SE 100. In a step S2, OS personalization data is loaded (step S2) into the SE, and stored (step S3) in the update agent. Subsequently, the OS is loaded into the SE (step S4) and personalized (step S6) using the OS personalization data stored in the update agent.

Steps S1 and S2 are performed within a certified environment during the factory production phase of the secure element. With reference to FIG. 5, this phase is identified as phase I. Steps S1 and S2 can be performed sequentially, that is, by means of two load commands (e.g., APDU commands), or in one step, in which the update agent is loaded together with the OS personalization data onto the secure element.

The OS personalization data is stored in a memory 120 of the update agent 110.

OS personalization data is thus securely loaded and stored in the SE and protected from unauthorized modifications. By the end of phase I, the OS personalization data, that is, the secure credentials, are thus being securely loaded into the tamper resistant SE and stored in the update agent, but they have not been tied to a specific OS image yet.

The actual software (e.g., operating system) is downloaded onto the SE in step S4. This step may occur during manufacturing the chip, but also in a later phase, when the chip is installed in a device (phase II in FIG. 5), during device initialization (phase III) or when the device is used by a customer (e.g., firmware update, phase IV).

After the OS image has been downloaded onto the SE, the OS retrieves in step S5 the OS personalization data from the memory 120 of the update agent 110 through the API 125, and stores the personalization data in its own memory part 135. Using these credentials, i.e., the personalization data, the downloaded OS image can then be personalized in step S6.

The structure of the secure element 100 depicted by the end of phase III in FIG. 5 corresponds to the structure of the SE 100 of FIG. 2, and shows the content of the secure element after OS personalization. The personalized OS image contains the credentials 135. This means that it contains the operative system plus its specific personalization/configuration, including credentials.

Figure 6:
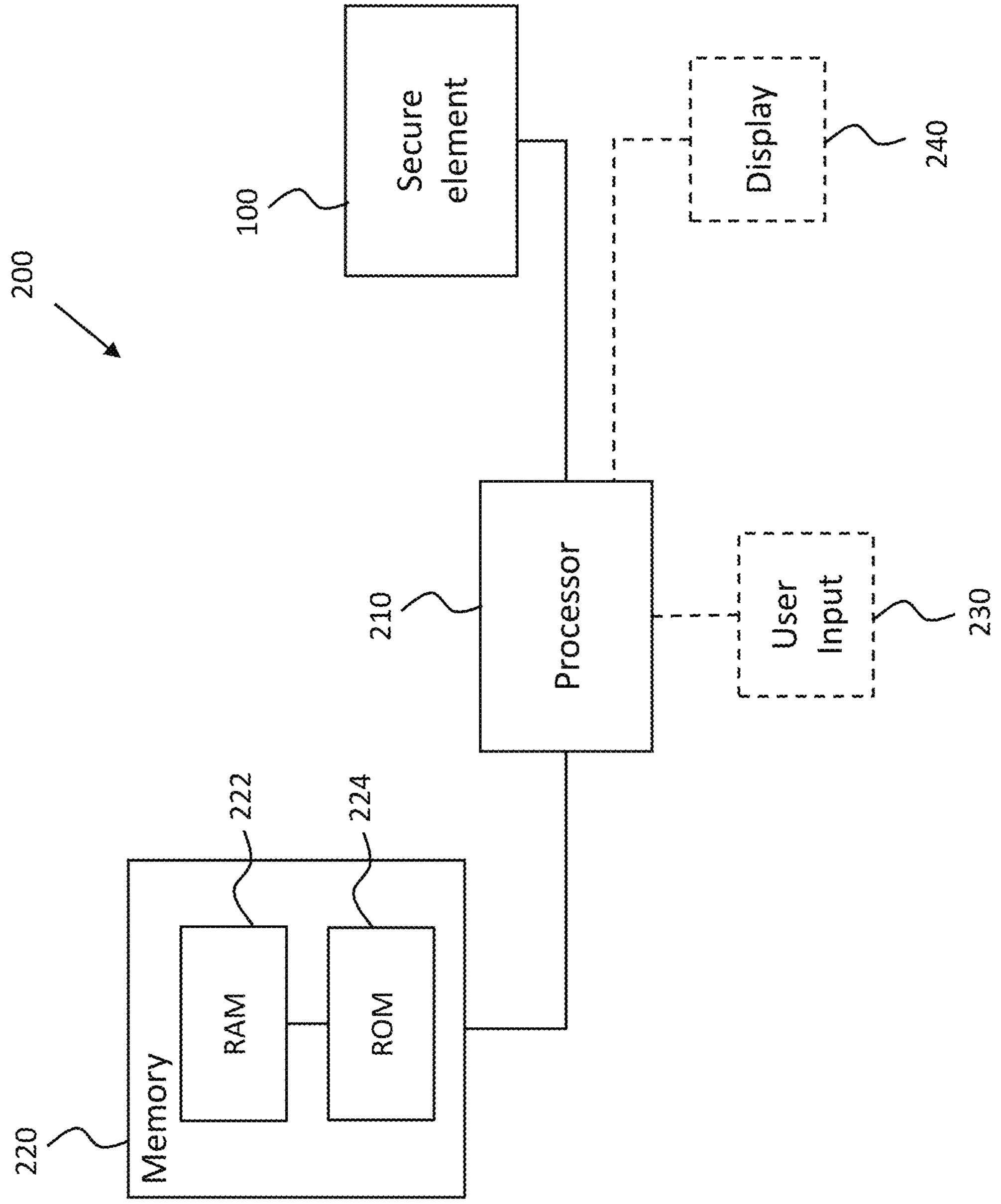
FIG. 6 shows a block diagram of components of an apparatus according to an embodiment.

FIG. 6 is a schematic diagram of components of an apparatus according to an embodiment. The apparatus may be an electronic device in communication with a secure element (e.g., the SE 100 in FIGS. 2 and 3), or a device, the secure element 100 is embedded on, such as, for instance the device 200 of FIG. 3. The apparatus may have a processor 210, a memory 220 closely coupled to the processor and comprised of a RAM 222 and a ROM 224, and optionally, a user input 230 and a display 240. The processor may be connected to the secure element 100 of FIG. 1, through a suitable interface, to control the secure element 100, to perform at least some of the aforementioned operations as exemplified in connection with FIG. 4. In particular, the processor 210 may cause the electronic device 200 to provide to the secure element, SE 100, a software image (e.g., an OS image), to be loaded and stored thereon. The processor may further cause the electronic device 200 to instruct the SE 100 to perform authentication and/or decryption of the software image using authentication data stored in the SE. The processor may further cause the electronic device 200 to instruct the SE 100 to retrieve personalization data 135 stored in the SE 100, to perform personalization of the OS image using the personalization data 135, and to store the personalized software image in the SE 100.

The methods and apparatus as described through the embodiments above, provides an efficient and secure solution for loading trusted software independently of the corresponding personalization data in a secure element. As the trusted software does not need to be loaded at the same time with the personalization data, a flexible solution for loading, updating and personalizing software at any time during the lifecycle of a secure element is provided.

For instance, the solution allows for the actual OS to be loaded in later stages of the production chain, meaning that the OS-to-be-loaded could be decided later on.

In the foregoing specification, the invention has been described with reference to specific embodiments thereof. It will, however, be evident that various modifications and changes may be made thereto without departing from the broader scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for loading and personalizing a software, including an operating system, OS, in a secure element, SE, the method comprising:

loading an update agent into the SE;

loading software personalization data into the SE together with the update agent during a production phase of the SE in a certified environment;

storing the software personalization data in a memory of the update agent;

loading a software image into the SE in a subsequent phase after the production phase of the SE, wherein, before the software image is loaded, the software personalization data is stored independently of, and is not tied to, a specific software image;

obtaining, after loading the software image, the software personalization data from the memory of the update agent through an Application Programming Interface, API, which communicates the software personalization data to the operating system; and personalizing the loaded software image using the software personalization data;

wherein the secure element is configured to retrieve the personalization data by instructing the OS to perform a data recovery procedure with the update agent through the API.

2. The method according to claim 1, wherein the software personalization data comprises secure credentials, including a set of cryptographic keys.

3. The method according to claim 1, wherein the update agent comprises a further memory for storing authentication data for authenticating a software image, wherein the method comprises further performing authentication and/or decryption of the software image using authentication data stored in the further memory.

4. A secure element, SE, comprising an update agent and an operating system, OS, wherein the update agent and the operating system are independent entities and are configured to communicate with each other through an Application Programming Interface, API, wherein the update agent comprises:

a first memory storing authentication data for authenticating a software image, wherein only the update agent has access to the first memory; and a second memory storing personalization data for personalizing the software image, the personalization data comprising secure credentials that, before the software image is loaded into the SE in a subsequent phase after the production phase, are stored independently of, and are not tied to, a specific software image, and the second memory being accessible by the update agent and being accessible by the operating system through the API, wherein the update agent is loaded into the SE during a production phase of the SE in a certified environment together with the personalization data, wherein the secure element is configured to instruct the operating system to retrieve the personalization data stored in the second memory of the update agent, to perform personalization of the software image using the personalization data, and to store the personalized software image in a memory of the SE, wherein the secure element is configured to retrieve the personalization data by instructing the OS to perform a data recovery procedure with the update agent through the API.

5. The secure element according to claim 4, wherein the update agent is configured upon receiving the software image, to perform authentication of the software image using the authentication data stored in the first memory of the update agent.

6. The secure element according to claim 4, wherein the update agent is configured upon receiving the software image, to decrypt the software image using the authentication data stored in the first memory of the update agent.

7. An update agent for use in a secure element, comprising:

a first memory for storing authentication data for authenticating software images, wherein the first memory is configured to be accessible only by the update agent; and a second memory for storing personalization data for personalizing software images, wherein the second memory is configured to store the personalization data loaded together with the update agent into the SE during a production phase of the SE in a certified environment, the personalization data comprising secure credentials that, before a corresponding software image is loaded into the SE in a subsequent phase after the production phase, are stored independently of, and are not tied to, a specific software image, wherein the SE is configured to retrieve the personalization data by instructing the operating system to perform a data recovery procedure with the update agent through an application programming interface, API.

8. The update agent according to claim 7, wherein the update agent is configured upon receiving a software image from a device in the subsequent phase, to perform authentication and/or decryption of the software image using the stored authentication data, and to provide, after the software image is loaded into the SE, to an operating system of the secure element the personalization data corresponding to the software image through the API.

9. An electronic device, comprising:

at least one processor;

at least one memory including computer program code; and a secure element comprising an update agent and an operating system configured to communicate with each other through an API, the update agent having a memory storing software personalization data comprising secure credentials loaded into the SE together with the update agent during a production phase of the SE in a certified environment, wherein, before the software image is loaded, the software personalization data is stored independently of, and is not tied to, a specific software image;

wherein the at least one processor with the at least one memory and the computer program code, being arranged to cause the electronic device to at least perform:

providing to the secure element, SE, a software image, to be loaded and stored thereon in a subsequent phase after the production phase;

instructing the SE to perform authentication and/or decryption of the software image using authentication data stored in the SE; and instructing the SE to obtain, after loading the software image, the software personalization data stored in the memory of the update agent through the API, to perform personalization of the software image using the personalization data, and to store the personalized software image in the SE, wherein the SE is configured to retrieve the software personalization data by instructing the operating system to perform a data recovery procedure with the update agent through the API.

10. A computer program product for use in conjunction with a secure element in an electronic device, the computer program product comprising a non-transitory computer-readable storage medium and a computer-program mechanism embedded therein, to load a software into the secure element in the electronic device, the computer-program mechanism comprising computer-executable program code that, when executed by at least one processor, causes the electronic device to:

receive, from an image delivery server, in a subsequent phase after a production phase of the SE, a software image to be loaded onto the SE, wherein the SE includes an update agent loaded into the SE during the production phase in a certified environment together with personalization data stored in a memory of the update agent, the personalization data comprising secure credentials that, before the software image is loaded, are stored independently of, and are not tied to, a specific software image;

authenticate and/or decrypt the software image using authentication data stored in the SE;

obtain, after loading the software image, the personalization data from the memory of the update agent through an API, which communicates the personalization data to an operating system of the SE;

personalize the software image using personalization data that is obtained from the memory of the update agent; and install the personalized software image on the SE, wherein the SE is configured to retrieve the personalization data by instructing the operating system to perform a data recovery procedure with the update agent through the API.

* * * * *